Aug. 4, 1970 R. ZAPHIROPOULOS 3,523,158
ELECTROGRAPHIC COLOR IMAGE PRINTING APPARATUS EMPLOYING
TRIAD COLOR STRIP ZONE DEVELOPMENT
Filed Jan. 30, 1967 2 Sheets-Sheet 1

INVENTOR.
RENN ZAPHIROPOULOS
BY Wm J Nolan
ATTORNEY

INVENTOR
RENN ZAPHIROPOULOS
BY Wm. J. Nolan
ATTORNEY

United States Patent Office 3,523,158
Patented Aug. 4, 1970

3,523,158
ELECTROGRAPHIC COLOR IMAGE PRINTING APPARATUS EMPLOYING TRIAD COLOR STRIP ZONE DEVELOPMENT

Renn Zaphiropoulos, Los Altos, Calif., assignor to Varian Associates, Palo Alto, Calif., a corporation of California Filed Jan. 30, 1967, Ser. No. 612,471
Int. Cl. H04n *1/30*
U.S. Cl. 178—5.2 5 Claims

ABSTRACT OF THE DISCLOSURE

An electrographic color printing and reproduction machine is disclosed. In the machine, a color image or picture to be reproduced is scanned in a line-by-line manner by a flying-spot scanner pick-up device. The pick-up device has three channels, one for each of the primary colors, red, green and blue. A line array of pin-shaped electric writing electrodes are arranged over and across the charge retentive surface of a moving web of electographic recording paper. The electrodes are arranged in groups of three. One electrode of each group is connected into the "red" channel. Another electrode of each group is connected into the "green" channel and the last electrode of each group is connected into the "blue" channel. The electrode groups are successively scanned and energized with writing potentials in synchronism with the three separate outputs of the flying-spot scanner pick-up device. Three separate inkers, one for each of the three colors, are arranged across the web for inking the line-shaped charge images layed down on the moving electrographic paper by the writing electrodes. Each inker includes an array of inking slots for applying ink to narrow line-shaped inking zones on the web. The slots of each inker are aligned in registration with its corresponding electrode and, thus, line charge images corresponding to its respective color. In this manner, the color images or pictures which are scanned are reproduced on the web.

CROSS REFERENCES TO RELATED APPLICATIONS

Copending U.S. application Ser. No. 612,540 filed Jan. 30, 1967 and assigned to the same assignee as that of the present invention describes and claims an inking apparatus in an electrographic device. The inker inks adjacent strip-like zones of the images on a recording web with different colored pigments. That patent application also describes the electrode array and inking apparatus of the present invention.

DESCRIPTION OF THE PRIOR ART

Heretofore, color electrophotographic prints have been made by exposing a xerographic plate to the color image through a red filter, then developing the red image with its complementary color (cyan) and then transferring the cyan powder image to a sheet of white paper. The xerographic plate is then exposed to the color image through a green filter. The image is then developed on the plate with magenta toner and the powder image transferred to the paper and superimposed upon the cyan powder image. The xerographic plate is then exposed to the color image through a blue filter. The plate is then developed with a yellow toner. The yellow powder image is then transferred to the white paper sheet and superimposed upon the cyan and magenta powder images to produce a composite color image which is then fixed by conventional heating techniques. The problems with this process are that it requires a xerographic plate and it imposes severe registration problems, in that, on each successive powder development and transfer of the powder image to the paper, such transfer must be made with precise registration.

SUMMARY OF THE INVENTION

The present invention provides means for electrographically printing color images.

One feature of the present invention is the provision of an electrode structure for laying down a charge image pattern on a charge retentive surface of a recording medium to be inked with the three primary colors to form a color print.The image pattern is layed down in an array of lines of charge grouped in groups of three lines, one line for each of the primary colors. Three primary color inkers are provided. Each inker has an array of applicators for applying the ink only to the respective line-shaped zones of charge on the recording medium corresponding to its primary color, whereby color images are produced.

Another feature of the present invention is the same as the preceding feature wherein the electrode structure for laying down the lines of charge comprises an array of electrodes extending across the recording medium. Such electrodes are grouped in groups of three with an electrode of each group for each of the three primary colors.

Another feature of the present invention is the same as the preceding feature including the provision of three separate electrical channels for scanning and picking up the electrical signals corresponding to the primary color content of a color image to be printed and the outputs of the three channels being employed to energize the respective "color" electrodes of the array.

Another feature of the present invention is the same as any one or more of the preceding features wherein the inkers each include an array of slots serving as the applicators for applying the ink to the respective line-shaped zones on the recording medium.

Other features and advantages of the present invention will become apparent upon a perusal of the following specification taken in conjunction with the accompanying drawings wherein:

DESCRIPTION OF THE PREFERRED EMBODIMENTS

Figure 1:
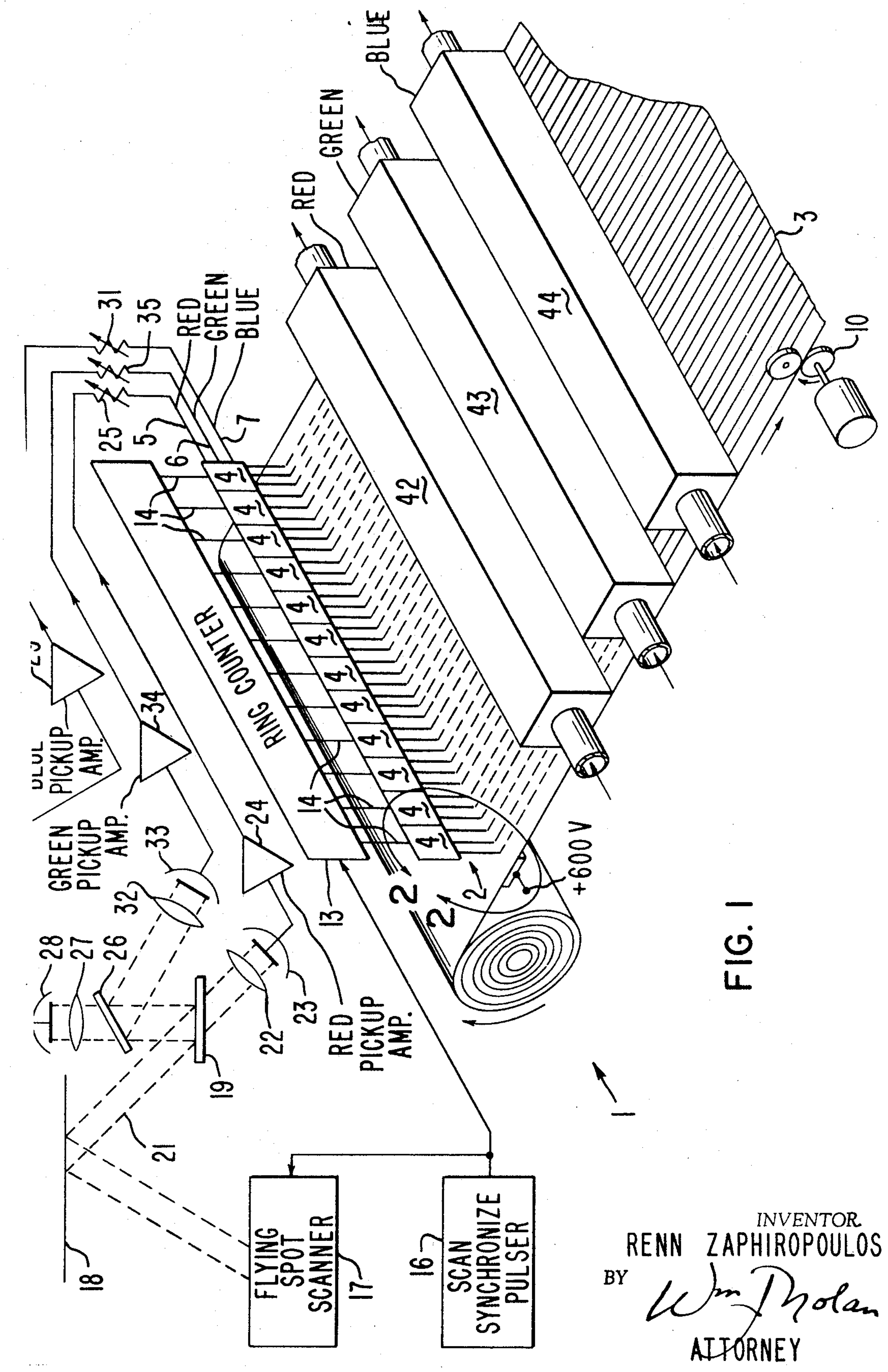
FIG. 1 is a schematic diagram of a color image printer of the present invention.

Referring now to FIG. 1, there is shown the color image printer 1 of the present invention. The printer 1 includes an array of pin-shaped writing electrodes 2 extending across an electrographic recording medium 3 such as, for example, a strip of electrographic recording paper. Such a recording paper comprises a thin film of dielectric formed on a conductive paper backing. The film serves as the charge retentive surface of the recording paper. A suitable recording paper is lot 65–50–B electrographic paper marketed by Plastic Coating Corporation of Holyoke, Mass. The recording web or paper 3 is drawn from a supply roll past the array of writing electrodes 2 by any suitable means such as a motor driven friction wheel 10 which engages the paper 3.

Figure 2:
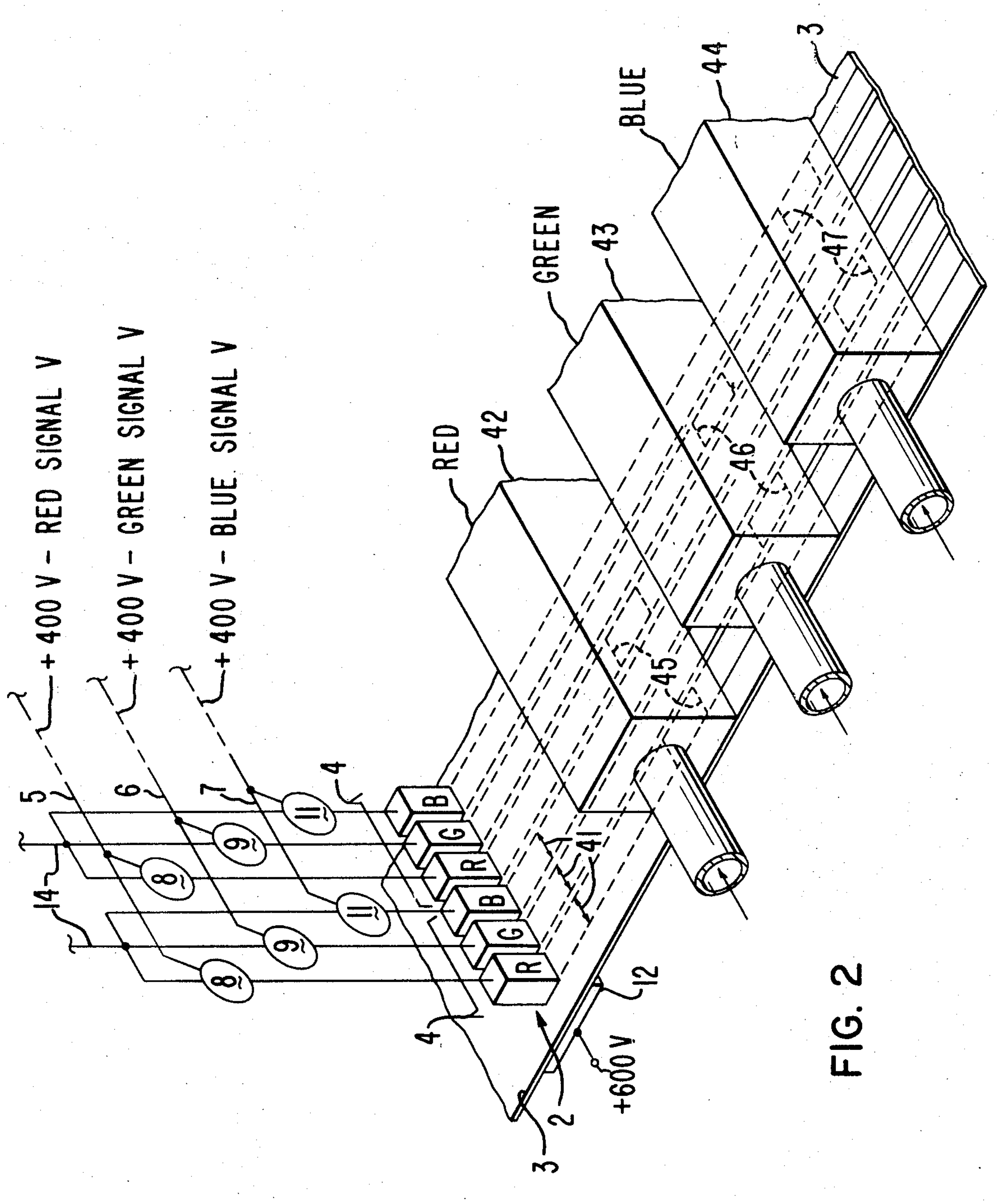
FIG. 2 is an enlarged schematic diagram of a portion of the structure of FIG. 1 delineated by line 2—2.

The writing electrodes 2 are arranged in groups 4 of three, one for each of the three primary colors (see the detail of FIG. 2). Each of the electrodes 2 is connected to its respective color bus 5, 6 or 7 through switching transistors 8, 9 and 11, respectively. A conductive plate electrode 12 is disposed below the ends of the pin electrodes 2 on the conductive side of the recording web or paper 3. The plate electrode is connected to a source of potential such as, for example, +600 volts. Each of the color buses is connected to a source of potential such as, for example, +400 volts which is just above, i.e., more positive than, the threshold charge image forming voltage of the printer 1. The threshold charge image voltage is a potential between the buses 5, 6 and 7 and the plate electrode 12, which when exceeded, causes a charge image to be formed on the charge retentive surface. Thus in the absence of a negative voltage color signal superimposed upon the color buses 5, 6 and 7, which cause the threshold voltage to be exceeded, no charge image will be formed upon the paper 3.

A ring counter 13, of conventional design and more fully described in U.S. Pat. 3,394,383 filed Sept. 28, 1966 and assigned to the same assignee as the present invention, has its outputs connected via leads 14 to the switching transistors 8, 9 and 11 for sequentially gating the potentials on the color buses 5, 6 and 7 to the respective groups 4 of writing electrodes 2. The gating transistors 8–11 of each group 4 are all connected in parallel with each of the outputs 14 of the ring counter for simultaneouly connecting all three electrodes of the selected group 4 to their respective buses 5, 6 and 7.

A scan synchronize pulser 16 supplies a train of pulses to the ring counter 13 to cause the ring counter to sequentially energize the groups 4 of writing electrodes 2. The scan synchronize pulser 16 also supplies its output to a flying-spot scanner 17 to cause the scanner to scan a spot of white light across a color image 18 to be reproduced. The spot of light is scanned across the image 18 in a line-by-line manner with the movement of the spot being in a succession of steps for each line. The steps are made in accordance with the pulses supplied from the scan synchronize pulser 16 and, thus, are synchronized with the succession of outputs of the ring counter 13. The recording paper 3 is advanced in accordance with each line advance of the flying-spot scanner 17.

The light reflected from the illuminated spot on the image 18 to be reproduced passes through a ⅓ transmission silvered mirror 19 with its plane surface disposed at 45° to the axis of the reflected light beam 21. One-third of the spot reflected light passes to a red filter 22 which passes only the red light components to a photodetector 23. The D.C. output of the red light photodetector 23 is fed to a red pick-up amplifier 24 which amplifies the red light signal and feeds same to the "red" bus 5 via a variable resistor 25 serving as a variable gain control.

Two-thirds of the reflected light from the spot is reflected from the mirror 19 to a one-half transmission silvered mirror 26. One-third of the total spot reflected light is passed through mirror 26 to a blue filter 27 which passes only the blue light components to a second photo-detector 28. The D.C. output of the blue light sensing photo-detector 28 is fed to a blue pick-up amplifier 29 and thence to the "blue" bus 7 via variable resistor 31 serving as a "blue" gain control.

One-third of the total spot reflected light, as reflected from mirror 26 is passed to a green filter 32 which passes the green color components to a photo-detector 33. The D.C. output of the photo-detector 33 is fed to a "green" pick-up amplifier 34 and thence to the "green" bus 6 via variable resistor 35 serving as a variable gain control.

The "red," "green" and "blue" signal outputs are negative D.C. voltages superimposed upon the positive D.C. bias applied to the buses 5, 6 and 7. As previously mentioned, the buses are biased to a potential slightly above, i.e., more positive than, the threshold voltage such that no charge image is deposited upon the paper in the absence of a color signal. The color signals are subtracted from the bias potential to produce an increase in the potential drop across the gap between the gated writing electrode 2 and the opposed base plate electrode 12. This potential drop is sufficient to deposit charge on the charge retentive layer of the recording paper 3.

Thus, the writing electrodes 2, as gated and energized, deposit charge images to be developed (inked) upon the recording paper 3 in line-shaped zones 41 corresponding to the width of the individual electrodes 2. The electrodes 2 are made as narrow as possible such as, for example, on the order of a few mils wide and are as closely spaced as possible such as, for example, with a 1 mil spacing.

Three primary color inkers 42, 43 and 44 are disposed across the width of the recording paper 3. The inkers each comprise a hollow channel member containing an elongated chamber filled with a collodial suspension of pigment particles. The particles may be suspended in either a stream of air or a stream of quick drying dielectric liquid which flows through the channels 42, 43 and 44. In a colloidal suspension, the particles are charged and a suspension is chosen which has the particles charged oppositely to the sign of the electrical charge deposited by the electrodes 2 on the recording paper 3. Thus, the colored pigment particle will be attracted to and electrostatically bound to the charge images deposited upon the paper 3.

Each of the linking channels 42, 43 and 44 is apertured on the side adjacent the paper 3 with an array of slots 45, 46 and 47 communicating between the charge retentive surface of the recording paper 3 and the supply of ink flowing through the inking channels 42, 43 and 44. The slots of each array are aligned in registration with the particular color image zone 41 on the paper corresponding to that particular color to be printed or inked. More specifically, the red inker 42 has its slots 45 aligned only with the line-shaped image zones 41 which are in registration with the "red" writing electrodes 2 of the array of electrodes. Similarly, the green inker 43 has its slots 46 aligned only with the line-shaped image zones 41 which are in registration with the "green" writing electrodes. Likewise, the blue inker 44 has its slots 47 aligned only with the line-shaped image zones 41 which are in registration with the "blue" writing electrodes. The inking slots 45, 46 and 47 are preferably elongated in a direction parallel to the direction of the line-shaped inking zones 41 in order to assure that an adequate amount of ink will flow to the charge images to be inked. The slots 45, 46 and 47 have widths substantially equal to the widths of the zones 41 to be inked. The slots 45, 46 and 47 are conveniently formed by photo-etching a thin sheet of metal according to the desired pattern of slots. The slotted metal sheet is then preferably coated with a thin insulative coating and sealed at its edges across the open side of the inking channel. The inking channels are preferably adjustable in position across the paper 3 such that their slot positions can be adjusted for precise alignment with the respective inking zones 41.

After the recording paper 3 has been drawn past the electrode array 2 and the three inkers 42, 43 and 44, the color image 18 will have been reproduced and color printed on the paper 3.

Although the color printing machine 1 has been described employing a digital type scanning mechanism, as an alternative, an analog type scan may be employed. In such a case, the ring counter would include a circuit for developing a voltage with an amplitude corresponding to its digital count output at any instant of time. This output signal would be compared in an error detector with a synchronizing analog sweep signal, i.e., repeating ramp signal, to produce an error signal for controlling a pulser to cause the counter to track the ramp signal. The synchronizing ramp signal would also control the flying-spot scanner. Any one of a number of different scanners may be employed to derive the three primary color content signals which are fed to the color buses 5, 6 and 7. For example, a color television type camera system may be employed to derive the three color signals.

Although the primary colors of red, blue and green have been employed any other three primary colors may be substituted such as, for example, magenta, cyan and yellow.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a color image printing apparatus for reproducing a color image on a charge retentive surface formed by adjacent zone-lines of different colors which blend together to establish the ultimate color of the reproduction the combination comprising:

means responsive to the color image for providing sequences of electrical signals corresponding to the different colors forming the color image;

stationary charge depositing devices adjacently disposed across the charge retentive surface in groups, one charge depositing device in each group being associated with one of the different colors and selectively fired by the electric signal sequence of that color to produce a charge image on the charge retentive surface formed by adjacent charge line zones of each different color; and charge responsive inking apparatus associated with the charge depositing devices of each of the different colors for depositing pigment particles required by that color onto the charge retentive surface along the adjacent line shaped zones of charge, the line zones of pigment blending together to reproduce the color image.

2. The color image printing apparatus of claim 1 wherein the different colors are three primary colors, and three sequences of electric signals are provided by the means responsive to the color image, each sequence corresponding to one of the primary colors forming the color image.

3. The color image printing apparatus of claim 1 wherein the charge depositing devices are stylus electrodes.

4. The color printing apparatus of claim 2 wherein the inking apparatus has three series of ink dispensing openings, one in registration with the charge depositing means and charge line zone of each of the primary colors.

5. The color printing apparatus of claim 4 wherein the openings of the inking apparatus are elongated slots disposed parallel to the line zones of charge.

References Cited

UNITED STATES PATENTS

| | | | |
|---|---|---|---|
| 3,420,170 | 1/1969 | Smith | 101—211 |
| 2,143,376 | 1/1939 | Hansell. | |
| 2,951,894 | 9/1960 | Hirsch | 346—140 |
| 3,045,644 | 7/1962 | Schwertz. | |
| 3,270,349 | 2/1966 | Murphy | 346—101 |
| 3,104,184 | 9/1963 | Wengenroth | 118—310 |
| 3,230,303 | 1/1966 | Macouski et al. | |

FOREIGN PATENTS

| | | |
|---|---|---|
| 470,294 | 12/1950 | Canada. |

ROBERT L. GRIFFIN, Primary Examiner

D. E. STOUT, Assistant Examiner

U.S. Cl. X.R.

178—6.6; 346—74